(12) United States Patent
Perry et al.

(10) Patent No.: US 8,393,575 B2
(45) Date of Patent: Mar. 12, 2013

(54) RIB POST

(75) Inventors: Richard J. Perry, Cowes (GB); Paul M. Anderson, Cowes (GB); Dale J. Edmunds, Shanklin (GB); Sam T. Hutchins, East Cowes (GB)

(73) Assignee: GKN Aerospace Services Limited, Isle of Wight (GB)

( * ) Notice: Subject to any disclaimer, the term of this patent is extended or adjusted under 35 U.S.C. 154(b) by 652 days.

(21) Appl. No.: 12/440,662

(22) PCT Filed: Sep. 11, 2007

(86) PCT No.: PCT/GB2007/003422
§ 371 (c)(1),
(2), (4) Date: Oct. 22, 2009

(87) PCT Pub. No.: WO2008/032040
PCT Pub. Date: Mar. 20, 2008

(65) Prior Publication Data
US 2010/0025529 A1  Feb. 4, 2010

(30) Foreign Application Priority Data
Sep. 12, 2006 (GB) .................................. 0617946.9

(51) Int. Cl.
*B64C 3/18* (2006.01)
(52) U.S. Cl. ..................................... 244/123.1; 244/119
(58) Field of Classification Search ............... 244/123.1, 244/123.7–123.8, 131, 132; 248/503, 503.1; 29/897.2, 897.32, 419
See application file for complete search history.

(56) References Cited

U.S. PATENT DOCUMENTS

| 1,357,073 A | * | 10/1920 | Mooney ........................ 403/178 |
| 1,388,543 A | | 8/1921 | Barling |
| 2,483,134 A | | 9/1949 | Gitz et al. |
| 2,567,124 A | | 9/1951 | Roberts |

(Continued)

FOREIGN PATENT DOCUMENTS

| GB | 366 079 | 1/1932 |
| GB | 366079 A | 1/1932 |

(Continued)

OTHER PUBLICATIONS

Patent Cooperation Treaty; International Search Report and Written Opinion for corresponding application PCT/GB2007/003422; dated Oct. 26, 2007.

(Continued)

*Primary Examiner* — Tien Dinh
*Assistant Examiner* — Nicholas McFall
(74) *Attorney, Agent, or Firm* — Quarles & Brady LLP

(57) ABSTRACT

A rib post (10) has a hollow substantially triangular cross-section comprising composite material. The rib post (10) can form a structural member to join two adjacently placed components together, for example a spar and internal rib in a wing of an aircraft. The rib post (10) can be formed from first (12), second (14) and third (16) walls. The first wall (12) can abut a surface of one component and the second wall (14) can abut a surface of a second component. The first and second walls (12, 14) can be attached to the respective components, such as a rib and spar, to join them together. The third wall (16) joins together the first and second walls (12, 14) to form the hollow triangular section.

29 Claims, 7 Drawing Sheets

U.S. PATENT DOCUMENTS

| | | | |
|---|---|---|---|
| 3,648,920 A | | 3/1972 | Stump |
| 5,332,178 A | * | 7/1994 | Williams .................... 244/123.3 |
| 6,655,633 B1 | * | 12/2003 | Chapman, Jr. ............. 244/123.9 |
| 2005/0064134 A1 | * | 3/2005 | Brantley et al. ............... 428/119 |

FOREIGN PATENT DOCUMENTS

| JP | S63-017200 A | 1/1988 |
|---|---|---|
| JP | S63-258297 A | 10/1988 |
| JP | H02-022255 U | 11/1991 |
| JP | H02-032059 U | 12/1991 |
| JP | H05-286496 A | 2/1993 |
| JP | 05 286496 | 11/1993 |
| JP | 05286496 A | 11/1993 |
| JP | 11148792 A | 6/1999 |

OTHER PUBLICATIONS

Japanese Office action mailed Oct. 4, 2011 for corresponding Japanese patent application No. 2009-527881; 3 pages.

The International Search Report and Written Opinion as mailed on Oct. 26, 2007 for International Patent Application PCT/GB2007/003422.

* cited by examiner

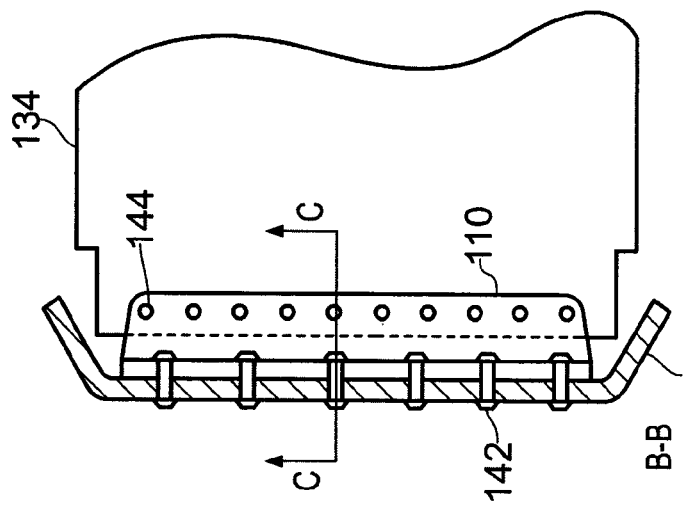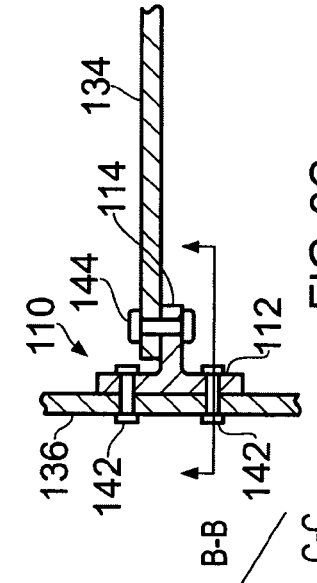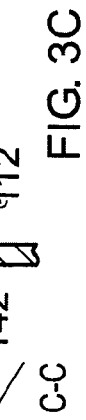
FIG. 3A
FIG. 3B
FIG. 3C
FIG. 3 (PRIOR ART)

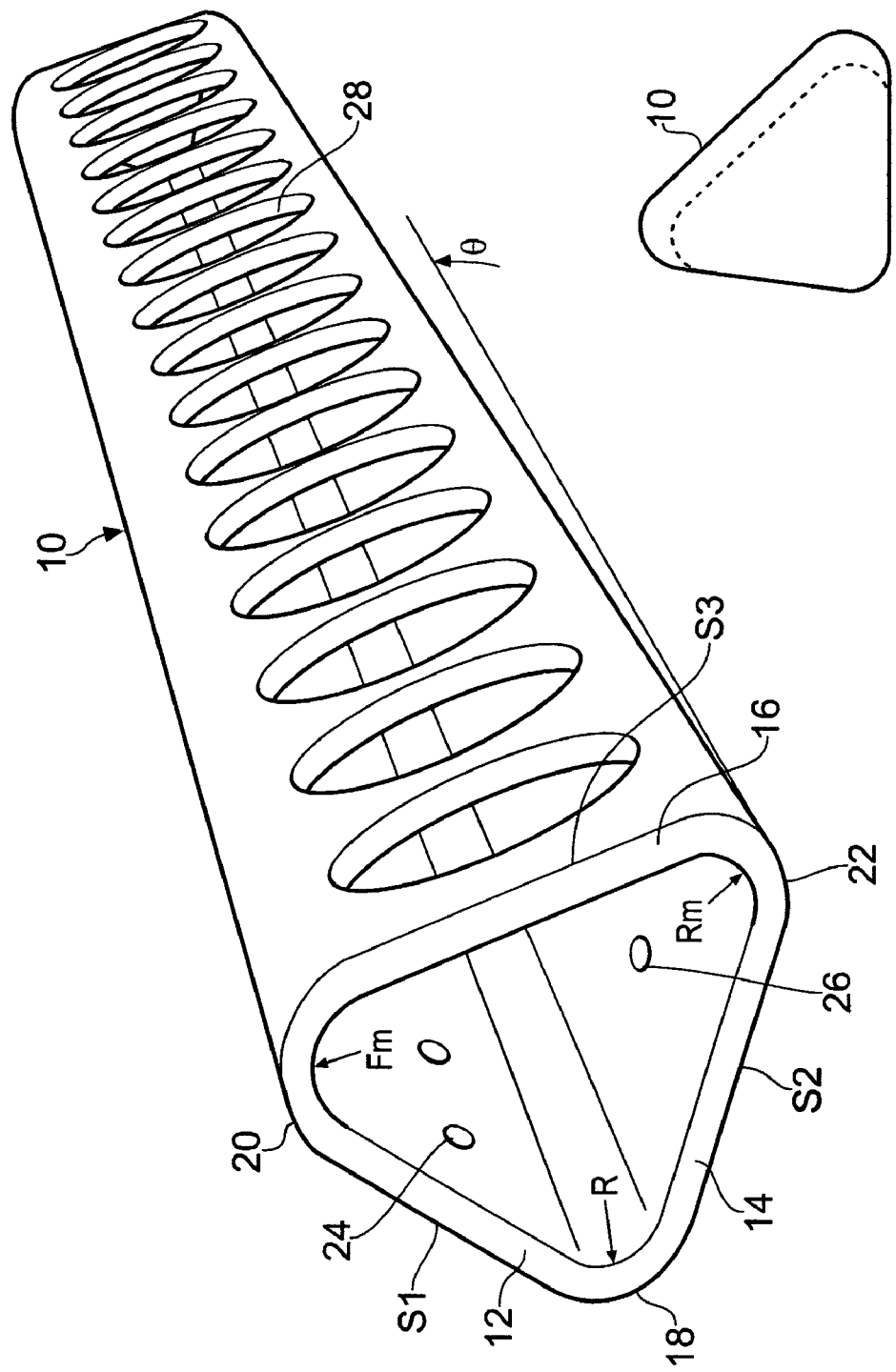

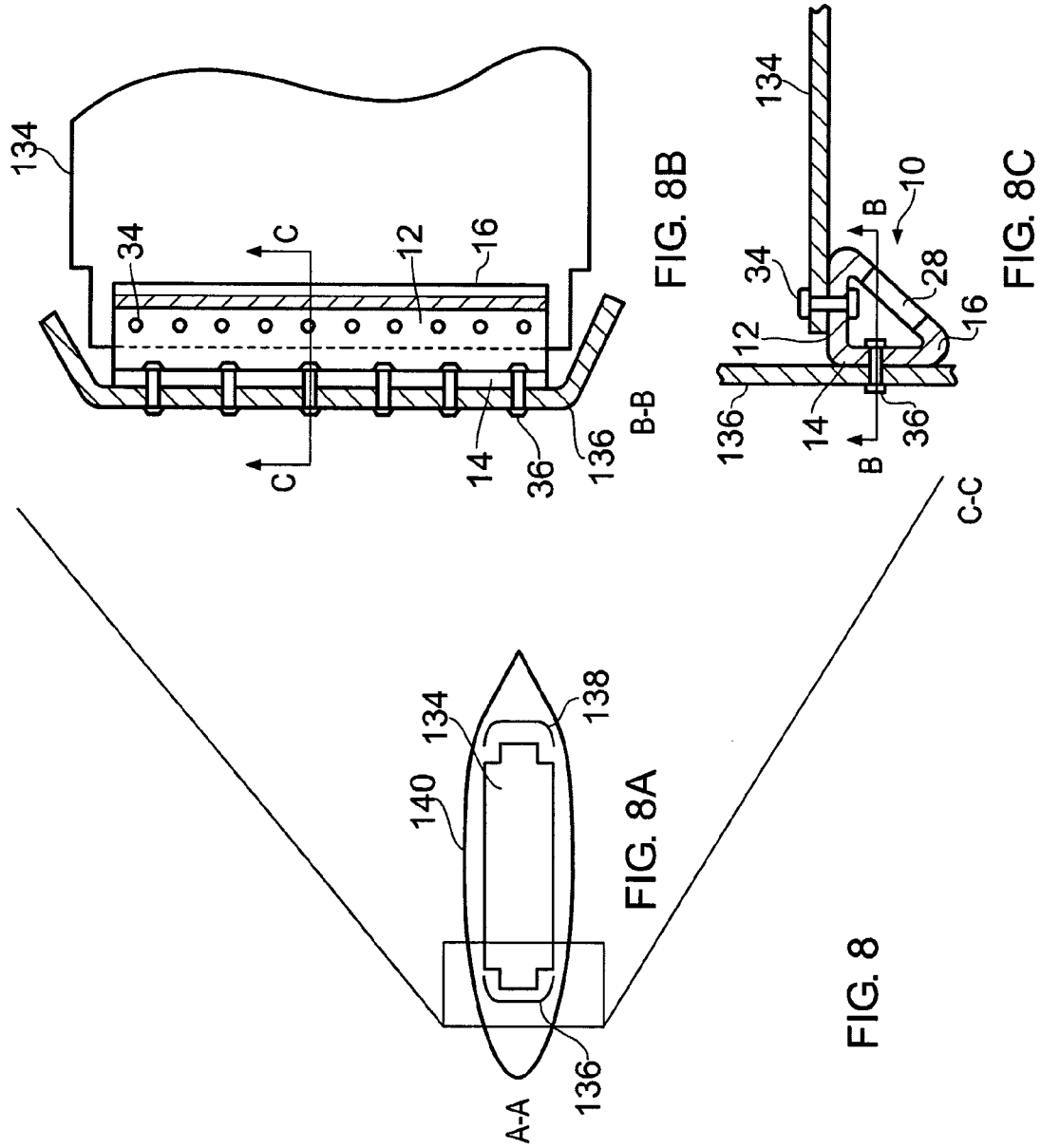

RIB POST

CROSS-REFERENCE TO RELATED APPLICATIONS

This application claims priority to PCT International Application No. PCT/GB2007/003422 filed on Sep. 11, 2007, which claims priority to British Application No. GB 0617946.9 filed on Sep. 12, 2006, incorporated by reference herein.

BACKGROUND

The present invention relates to a rib post, for example for use in aerospace structures, for example in an aircraft.

In aircraft, rib posts are used in aerofoils or airfoils (US), such as wings and horizontal/vertical stabilisers to connect internal ribs to spars.

Traditionally, rib posts for use as a primary structure in the construction of aircraft have been in the form of a T-section made from a variety of metallic materials, for example aluminium alloys. An example of a T-section made from metal is illustrated in FIG. 1.

For decades composite materials (also known as composites), for example carbon fibre reinforced composites (composites containing carbon fibres and epoxy resin) have become an increasingly attractive alternative to metal for many aircraft components. The carbon fibre reinforced composite material offers improved properties such as lower weight, improved fatigue/damage resistance, corrosion resistance and negligible thermal expansion.

However, the application of a T-section rib post made from composite materials does not necessarily offer any tangible benefit when compared with its metal counterpart. Design considerations, such as through thickness properties can render a T-section made from composite heavier than the equivalent metal component. Moreover, the complexities of the tooling required to produce a T-section from composite materials may render the composite structure more expensive than an equivalent metal part.

SUMMARY

The present invention provides a rib post comprising a hollow substantially triangular cross-section formed from composites.

In an embodiment of the invention, due to the closed form of the triangular rib post, through thickness stresses can be reduced compared with an open form such as a T-section. In an aircraft application, such as joining a spar to internal ribs in a wing, by using a closed section in the form of a triangular cross-section pull off forces from internal fuel pressure and other sources may cause lower through thickness stresses in the vicinity of the apex of the triangle that corresponds substantially with the angle defined by the spar and rib.

In an embodiment of the invention, as the rib post comprises composite materials, the combination of the closed form of the triangular cross-section and the composite materials can provide additional advantages compared with a T-section made of metal in that the rib post may have better strength properties with the added benefit of thermal stability, non-corrosion and fatigue resistance. Furthermore, a triangular rib post made from a composite material may be designed to be lighter and more cost effective to produce than a composite T-section or even a metal T-section.

Another aspect of the invention provides a structure in conjunction with the rib post described above.

A further aspect of the invention provides a method of manufacturing such a rib post.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Embodiments of the present invention will be described by way of example only with reference to the accompanying drawings in which:

FIG. 3A is a cross section along line A-A of FIG. 2 and FIGS. 3B and 3C are cross sections of part of the cross section of FIG. 3A illustrating the use of a prior art metallic T-section rib;

FIG. 5 is a perspective view of an example embodiment of a rib post having a hollow substantially triangular cross-section;

FIG. 6 is an end view of the rib post of FIG. 5 indicating that the rib post tapers along its length;

FIG. 8A is a cross section along line A-A of FIG. 2 and FIGS. 8B and 8C are cross sections of part of the cross section of FIG. 8A illustrating the use of a rib post having a hollow substantially triangular cross-section as illustrated in FIG. 5.

Figure 1:
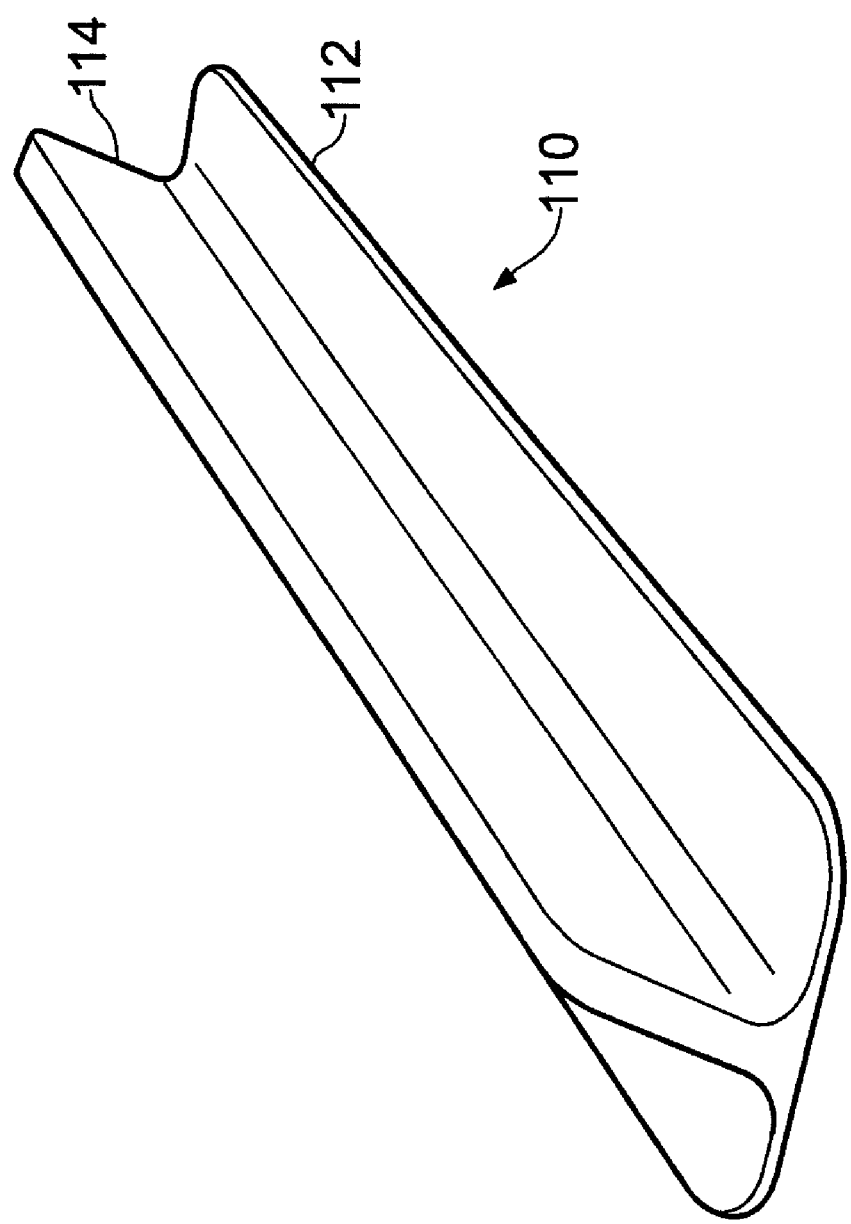
FIG. 1 is a perspective representation of a conventional prior art metallic T-section rib.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the claimed invention.

DETAILED DESCRIPTION

Referring to FIG. 1, a T-section made from metal materials has traditionally been used in the construction of wings or tails in aircraft to form a T-section rib post 110 to join internal ribs to spars. The T-section rib post 110 includes a head, or flange portion 112 and a leg or blade portion 114.

Figure 2:
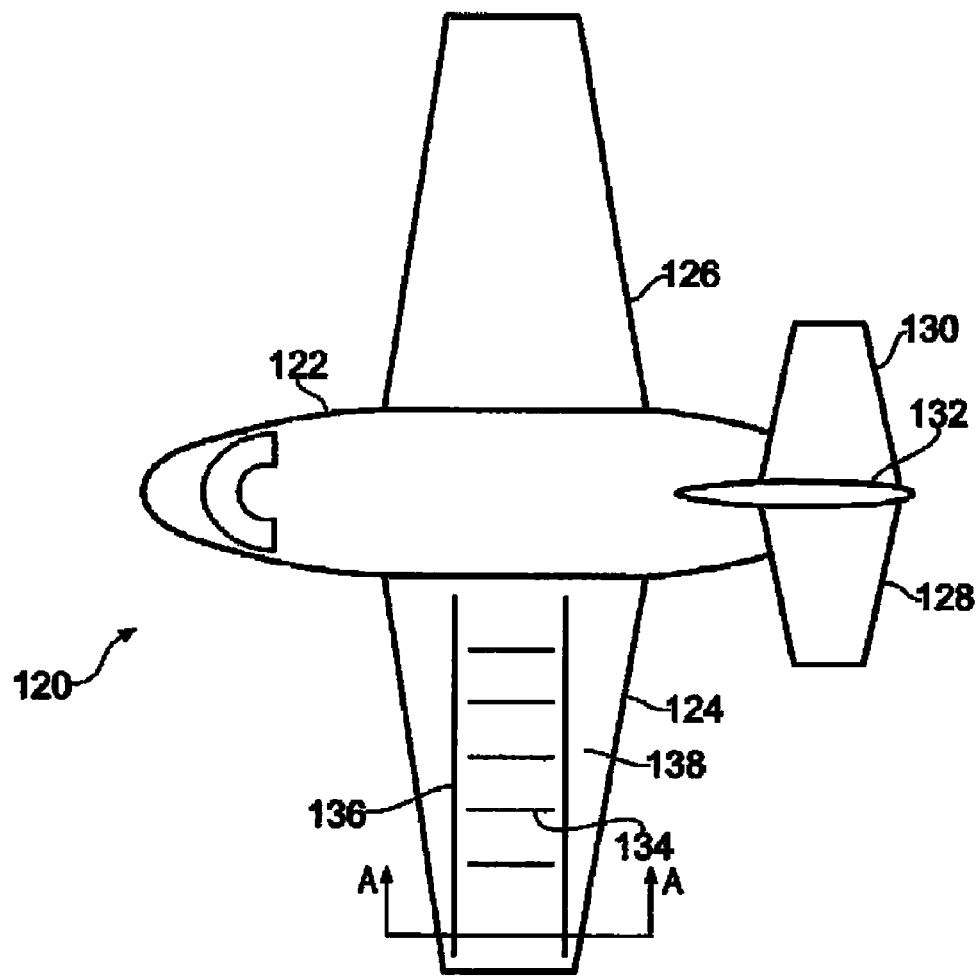
FIG. 2 is a schematic plan view of an aircraft showing front and rear spars and ribs of a wing of an aircraft.

FIG. 2 is a schematic plan view of an aircraft 120 showing front and rear spars and ribs of a wing of an aircraft. As represented in FIG. 2, the aircraft 120 comprises a fuselage 122, first and second main wings 124 and 126, first and second tail wings 128 and 130 and a tail, or tail plane 132.

FIG. 2 also includes a schematic representation of ribs 134 that extend between a front spar 136 and rear spar 138 within the wing 124. The ribs and spars 134, 136 and 138 are only shown in the wing 124, but equivalent ribs and spars 134, 136 and 138 are provided in the other wings 126, 128, 130 and also in the tail plane 132.

FIG. 3A is a schematic cross section along the line A-A in FIG. 2. FIG. 3 illustrates that the ribs 134 and the front and rear spars 136 and 138 are located within the outer surface 140 of the wing 124.

It will be appreciated that FIGS. 2 and 3A are merely schematic and their purpose is to illustrate the nature and the location of the ribs 134 and the front and rears spars 136 and 138.

FIGS. 3B and 3C are cross sections showing more details of an example of the connection of the rib 134 to the front spar 136 using a conventional T-section rib post 110. FIG. 3B is a cross section taken along line B-B in FIG. 3C and FIG. 3C is a cross section taken along line C-C in FIG. 3B. The head portion 112 of the T-section rib post 110 is joined to the front spar 136 by spar interface bolts 142 and the leg portion 114 of the T-section rib post 110 is joined to the rib 134 by rib interface bolts 144.

Figure 4:
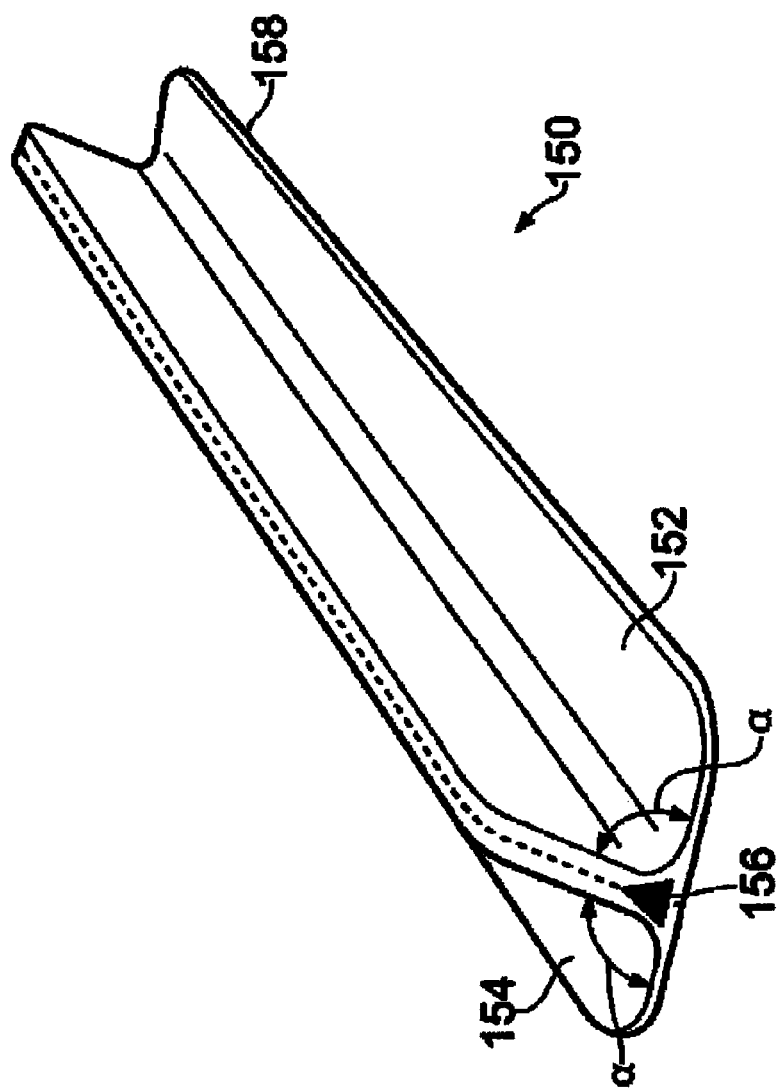
FIG. 4 is schematic perspective view of a T-section made from composite materials.

In many applications composites, for example composite materials comprising fibre reinforced resin-based materials, are known to present superior properties over metals. However, to form a T-section post from composite material would have significant disadvantages. FIG. 4 is a schematic representation of a T-section post 150 constructed from composite materials. As shown in FIG. 4, the T-shaped section post 150 comprises two angle sections 152 and 154 arranged back to back and overlaid with composite material to join the two angle-sections 152 and 154 together to form the T-section post 150. The angle sections 152 and 154 each comprise a rounded angle α. When the two angle sections 152 and 154 are placed together back-to-back and are overlaid to form the T-section post 150 the result of the rounded angles α coming together forms a triangular shaped void 156 between the two angle sections 152 and 154 at the head 158 of the T-shaped post. The triangular void 156 is a hollow section known as a deltoid or noodle. The deltoid 156 presents an area of weakness, wherein the T-section post 150 is susceptible to failure due to interlaminar stresses in the region of the deltoid 156. Therefore, it is desirable to fill the deltoid 156 with roving or similar filler material. The addition of the extra material increases the weight of the composite T-section post 150 and also makes it more expensive to produce compared with a T-section post 150 without the additional material. Consequently, the use of T-shaped section made from composite material would be disadvantageous compared to a metal T-section.

An example embodiment of the invention can provide a rib post formed from composite material, for example a fibre reinforced laminate, that does not suffer from such disadvantages.

An example of an embodiment of a composite tubular rib post 10 having a substantially triangular cross-section is illustrated in FIGS. 5 and 6. As described above, a tubular rib post 10 having a substantially triangular cross-section can have advantageous properties compared, for example to a metallic or composite T-shaped section 110/150.

The example rib post 10 as illustrated in FIGS. 5 and 6 has a hollow substantially triangular cross-section. The hollow substantially triangular cross section is defined by three adjoined substantially planar walls, or sides, 12, 14 and 16 (hereinafter first second and third walls 12, 14 and 16) having respective exterior surfaces S1, S2 and S3. In cross-section, each of the three walls 12, 14 and 16 define the legs/sides of a triangle. The leg of the triangle defined by the third wall 16 is longer than the legs provided by the first and second walls 12 and 14. An apex 18 is formed at the junction of the first and second walls 12 and 14, an apex 20 is formed at the junction of the first and third walls 12 and 16 and an apex 22 is formed at the junction of the second and third walls 14 and 16. The apexes 18, 20 and 22 of the triangle section are rounded. The radii $r_m$ of the apexes 20 and 22 may be smaller than the radius R of the apex 18. In use the radii $r_m$ tends to experience lower stresses than the radius R. Therefore, the size of radii $r_m$ can be designed to a minimum.

The rib post 10 can form a structural member to join two adjacently placed components together (for example an internal rib and a spar in a wing of an aircraft). The outer surface S1 of the first wall 12 of the rib post 10 can abut a surface of one component and the outer surface S2 of the second wall 14 of the rib post 10 can abut a surface of a second component. The first and second walls can be attached to the respective components (for example the rib and spar) to join them together. The third wall 16 of the rib post 10 joins together the first and second walls to form the hollow triangular section.

The first wall 12 of the rib post 10 can comprise holes 24 for receiving fasteners to fasten the rib post 10 to, for example a rib. The second wall 14 of the rib post 10 can comprise holes 26 for receiving fasteners to fasten the rib post 10 to, for example a spar. The number and the location of the holes and fasteners can be adapted according to particular embodiments. FIG. 6 also illustrates access holes 28 in the third wall of the rib post 10, as will be described in more detail below.

The closed form of the triangular cross-section of the rib post can provide lower through thickness stresses at the radius R, when compared with an open-section such as an angle section or a T-section.

In the example shown in FIGS. 5 and 6 the rib post 10 tapers along its length, the dotted line in the end view of the rib post in FIG. 6 representing the taper. In the example shown, the taper θ is such that the angle and curvature at the apex 22 is maintained, but that the cross-sectional area reduces uniformly from one end to the other. The angle and or curvature at the apex 18 can be selected to optimise the connection between the rib post 10 and adjoining members, for example a rib 30 and a spar 32, as will be described with reference to FIGS. 7 and 8.

Figure 7:
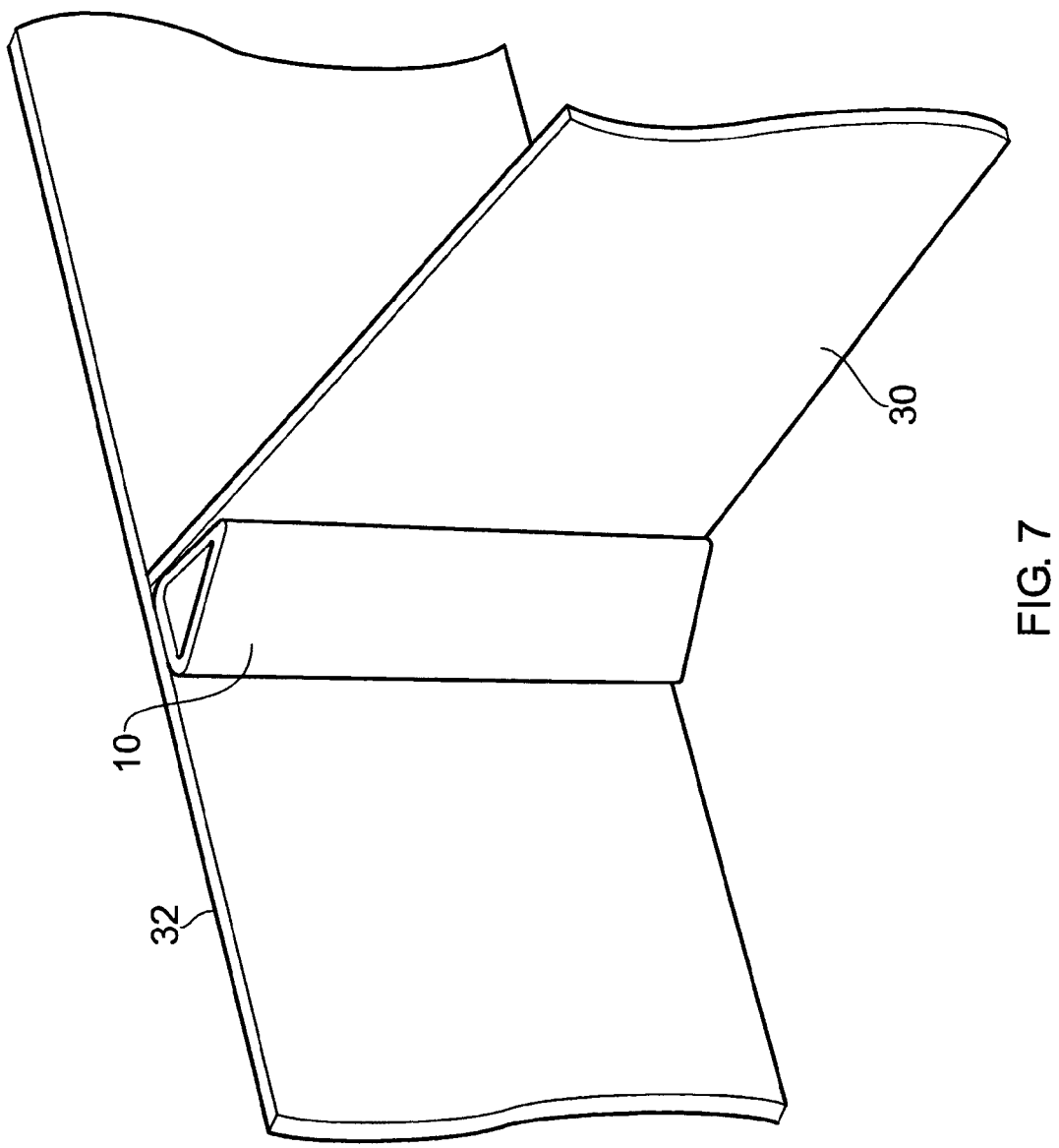
FIG. 7 is a perspective view of the rib post of FIGS. 5 and 6 being used to join two adjacent components together.

FIG. 7 shows a simplified view of the rib post 10 joining together two component parts, one of which can represent a rib 30 and one of which can represent a spar 32. An example of the substantially triangular cross-section rib post 10 can be used in, for example, a wing, in a horizontal or vertical stabiliser, or in another airframe or aerospace component, to connect an internal rib 30 to a spar 32.

In FIG. 7 the rib post 10 is illustrated as having solid walls. If blind fasteners are used to connect the rib post 10 to the rib 30 and/or spar 32 then the walls of the rib post can be solid, because fasteners can be inserted and secured from the rib or spar side of the assembly. Solid walls may also be provided if, for example, a rib 30 and/or spar 32 are connected to the rib post 10 using for example an adhesive or other bonding agent.

If fasteners, such as a nut and bolt arrangement are used then access to both sides of the fastener can be provided, for example by the access holes, or access apertures, 28 in the third wall 16 as shown in FIG. 5. The access apertures 28 may be any suitable size or shape to allow access to the fasteners at the inside surface of the first and second walls 12 and 14. The access apertures 28 illustrated in FIG. 5 are elliptical in shape and are arranged on the third wall 16 such that the major axis of each aperture is transverse to the longitudinal axis of the rib post 10.

It will be appreciated that the removal of the material to form the access apertures 28 provides a rib post 10 of reduced weight, without significantly compromising the structural integrity of the rib post 10. Accordingly, apertures in the third wall of the rib post 10 can be provided irrespective of manner of fastening or bonding the rib post 10 to the rib 30 and/or spar 32.

The first and second walls 12 and 14 provide respectively first and second substantially planar portions of the rib post 10 that can abut first and second faces each provided by one of the two adjacently placed components and the abutting faces can be attachable to each other such that the two adjacently placed components are joined together by suitable fastenings. For example, fasteners may be blind fasteners, such as rivets or blind bolts, wherein the fastener may be inserted and secured from one side only. Examples of suitable blind fasteners are locking spindle blind rivets manufactured under the name CherryMAX® or blind bolts manufactured under the name of COMPOSILOCK™. When using such fasteners the third planar portion provide by the third wall 14 of the rib post 10 may be solid. Alternatively, the fasteners may be provided by mating components such as nut and bolt which require access from both sides. To provide access to the fasteners at the inside of the rib post 10, the third planar portion may have one or more access apertures. The access apertures may be any suitable shape or size. The access holes can, for example, be elliptical having the major axis of the holes transverse to the longitudinal axis of the rib post. Removal of material from the third planar portion facilitates access to the fasteners, whilst also reducing the weight of the rib post 10. As an alternative to or in addition to fasteners, fastening using, for example, adhesives is also possible.

In an embodiment of the invention, the hollow triangular rib post 10 can thus comprise adjoined first, second and third planar portions, which are attachable about the first and second planar portions to respective faces of two adjacently placed components such as a spar and rib which are to be joined together.

The apex defined by the junction of the first and second planar portions can be configured to correspond with the angle defined by the junction of the two adjacent components.

The production of a triangular rib post 10 can be more versatile than a T-section in that the apex angles of the triangular rib post 10 may be formed to correspond more closely with the angle defined by the adjacent components. Even if the angle varies, the form of a composite material may be adaptable to such variation.

For example, the triangular cross-section can be that of an acute triangle. The cross-section may be in the form of a substantially equilateral triangle, or a substantially isosceles triangle or a substantially scalene triangle. Preferably, the third planar portion provides one side of the triangular cross-section that is longer than the other two sides of the triangular cross-section that are provided by the first and second substantially planar portions respectively. The size and form of the triangular cross-section is suitably made to suit the size of and the angle defined by the two adjacently arranged components to which the rib post 10 is attachable thereby facilitating joining the adjacently placed components together.

The three apexes of the triangular cross-section can be rounded. One apex that corresponds substantially with the angle defined by the adjacently arranged components can have a radius that is greater than the radius of the other two apexes.

The rib post 10 can be formed from a composite material that is fibre reinforced, for example formed from a composition of one or more resins with fibre reinforcement of, for example glass and/or carbon fibres. The fibres can be continuous, unidirectional fibres, which offer the ability to orientate the fibres in a direction where the greatest strength is required. Alternatively, the material used in forming the rib post 10 can be woven fabric (produced by interlacing warp and weft fibres). The rib post 10 can be formed from layers of such a material, that is it can be laminate. An example of a suitable carbon fibre reinforced composite material may comprise carbon fibres known as Tenax HTS 5631 (Trade name) manufactured by Toho Tenax together with a resin known as MTM44-1 (Trade name) manufactured by Advanced Composites Group.

Various techniques can be used to manufacture the rib post 10. Filament or tape winding, hand-lay up using a unidirectional pre-impregnated fibres or vacuum assisted resin transfer moulding (VARTM) techniques form examples of known methods of producing laminated composite structures and can form examples of suitable methods for producing the triangular rib post 10. To make the hollow triangular structure from each of the above methods the composite material may be laid over a male mandrel made out of, for example, a metal such as steel or aluminium, in either a multi-piece design or a single piece. The mandrel can be coated with a material, for example polytetrafluoroethylene (PTFE), to facilitate removal of the mandrel. The male mandrel may incorporate a small draft angle (taper) $\theta$ to facilitate removal of the mandrel from the rib post after the composite rib post has been cured. The draft angle $\theta$ can correspond with the taper $\theta$ (see FIG. 4a) along the length of the rib post 10. As an alternative to a removable solid mandrel, a deflatable or dissolvable mandrel can be used, whereby the mandrel is removed after forming of the hollow substantially triangular shape of the rib post 10. The holes 24 and 26 and apertures 28 can then be formed, for example, by machining.

If a deflatable or dissolvable mandrel, or a multi-piece mandrel is used, the triangular rib post 10 made from composite materials need not be tapered. However, in some embodiments, for example where a one piece mandrel is used, a substantially uniform taper along its length (where the angle between the first and second planar portions is maintained and the sizes of the sides and cross section of the triangular section reduce uniformly) can facilitate manufacture by enabling easier removal of tooling after the rib-post 10 is cured.

The effects of pull off forces from internal fuel pressure and other sources may cause reduced through thickness stresses in a closed triangular cross-section compared with an open T-section in the vicinity of the apex defined by the junction of the first and second planar portions. Therefore, the thickness of the laminate in the region of the apex 18 defined by the first and second planar portions 12 and 14, wherein the apex 18 corresponds substantially with the angle defined by the adjacently arranged components, may be less than the thickness of a laminate of a corresponding open angle-section or T-section. Due to the reduced stresses in the closed section, laminate thickness in the region of the apex 18 may be reduced and the radius R may be reduced resulting in a smaller and possibly lighter rib post 10. The closed form may be less expensive to produce than an equivalent rib post having an open form.

The structural properties of the composite rib post 10 may be further improved by adding reinforcement at the apexes 18, 20 and 22 during manufacture. Examples of suitable reinforcement can include Z-pins or by stitching the laminate (not illustrated). By reinforcing the rib post 10 at the apexes 18, 20 and 22, for example by laminate stitching or with Z pins, the added reinforcement at the apexes can also promote reduced thickness in the triangular structure, thereby reducing weight.

FIGS. 8A, 8B and 8C form a schematic representation in more detail of a triangular section rib post 10 joining a rib 134 to a spar, for example a front spar 136 in the wing 124 of the aircraft 120 represented in FIG. 2.

As represented in FIG. 2, the aircraft 120 comprises a fuselage 122, first and second main wings 124 and 126, first and second tail wings 128 and 130 and a tail plane 132. Ribs 134 extend between a front spar 136 and rear spar 138. The ribs and spars 134 and 136 are only shown in the wing 124 in FIG. 2, but equivalent ribs and spars 134 and 136 are provided in the other wings 126, 128, 130 and also in the tail, or tail plane 132.

The ribs 134 and the front and rear spars 136 and 138 are located within the outer surface 140 of the wing 124, as represented schematically in FIG. 8A, which forms a cross section along the line A-A of FIG. 2. It will be appreciated that FIGS. 2 and 8A are merely schematic and their purpose is to illustrate the nature and the location of the ribs 134 and front and rears spars 136 and 138.

FIGS. 8B and 8C are cross sections showing more details of an example of the connection of the rib 134 to the front spar 136 using a substantially triangular cross section rib post 10 as illustrated in FIG. 5. FIG. 8B is a cross section taken along line B-B in FIG. 8C and FIG. 8C is a cross section taken along line C-C in FIG. 8B.

As represented in FIGS. 8B and 8C, the triangular section rib post 10 is joined to the rib 134 by rib interface bolts 34 that pass through the first wall 12 of the rib post 10 and is joined to the front spar 136 by spar interface bolts 36 that pass through the second wall 14 of the rib post 10. Access to the rib interface bolts 34 and to the spar interface bolts 35 can be via the access apertures 28 in the third wall 16 illustrated in FIG. 5.

There has been described a rib post with a hollow substantially triangular cross-section comprising composite material. The rib post 10 can form a structural member to join two adjacently placed components together for example a spar and internal rib in a wing of an aircraft. The rib post 10 can be formed from first, second and third walls 12, 14 and 16. The first wall 12 can abut a surface of one component and the second wall 14 can abut a surface of a second component. The first and second walls 12 and 14 can be attached to the respective components such as a rib and spar to join them together. The third wall 16 joins together the first and second walls 12 and 14 to form the hollow triangular section.

Due to the closed form of the triangular rib post 10, through thickness stresses can be reduced compared with an open form such as a T-section. In an aircraft application, such as joining a spar to internal ribs in a wing, by using a closed section in the form of a triangular cross-section, pull off forces from internal fuel pressure and other sources may cause lower through thickness stresses in the vicinity of the apex 18 of the triangle that corresponds substantially with the angle defined by the spar and rib.

In an embodiment of the invention, the combination of the closed form of the triangular cross-section and the composite materials can provide additional advantages compared with a T-section made of metal in that the rib post 10 may have better strength properties with the added benefit of thermal stability, non-corrosion and fatigue resistance. Furthermore, a triangular rib post 10 made from composite materials may be designed to be lighter and may be more cost effective to produce than a composite T-section or even a metal T-section.

Although a variety of embodiments have been described herein, these are provided by way of example only, and many variations and modifications on such embodiments will be apparent to the skilled person and fall within the scope of the claimed invention.

For example, although in described embodiments the triangular rib post 10 is used to join ribs to spars in a wing, a hollow substantially triangular cross section rib post 10 comprising composite material can be used in other aerospace and other structures and applications.

The invention claimed is:

1. A rib post for attaching a rib to a spar in an aircraft, the rib post comprising composites and having a hollow substantially triangular cross-section wherein the hollow substantially triangular cross-section is formed by a first substantially planar portion for abutting a first surface and a second substantially planar portion joined to the first substantially planar portion and for abutting a second surface and a third substantially planar portion which joins together the first and second planar portions and wherein the third substantially planar portion comprises at least one aperture.

2. A rib post according to claim 1, wherein the third substantially planar portion provides one side of the substantially triangular cross-section that is longer than the other two sides of the substantially triangular cross-section that are provided by the first and second substantially planar portions respectively.

3. A rib post according to claim 1, wherein apexes of the triangular cross-section are rounded.

4. A rib post according to claim 3, wherein an apex defined by the first and second substantially planar portions has a radius greater than the radius of the apex defined by the first substantially planar portion and the third substantially planar portion and greater than the radius of the apex defined by the second substantially planar portion and the third substantially planar portion.

5. A rib post according to claim 3, wherein the radii of each of the apexes are substantially the same.

6. A rib post according to claim 1, wherein the rib post tapers uniformly along its length.

7. A rib post according to claim 1, wherein the hollow triangular cross section is made from fiber-reinforced composite material.

8. A rib post according to claim 7, wherein the fiber reinforcement is carbon fiber.

9. A rib post according to claim 7, wherein the material is laminate.

10. A rib post according to claim 7, wherein one or more apexes of the triangular cross-section are reinforced.

11. A rib post according to claim 10, wherein one or more apexes of the triangular cross-section are reinforced with Z-pins or stitching.

12. A rib post according to claim 1, wherein the at least one aperture is oval.

13. A rib post according to claim 12, wherein a major axis of the apertures is transverse to the axis of the rib post.

14. A rib post according to claim 1, wherein the rib post is configured to attach the rib to the spar in the aircraft.

15. A rib post according to claim 1, wherein the first substantially planar portion has a first set of attachment holes formed therein and the second substantially planar portion has a second set of attachment holes formed therein and wherein the at least one aperture in the third substantially planar portion is larger than the first and second sets of attachment holes to provide access to the first and second set of attachment holes.

16. A structure comprising a first part, a second part and a rib post, the rib post having a hollow triangular cross-section that is arranged such that a first face of the hollow triangular cross-section abuts and is connected to a face of the first part, and a second face of the hollow triangular cross-section abuts and is connected to a face of the second part, whereby the first and second parts are thereby joined together wherein the first and second parts are a spar and a rib component, respectively, and wherein the spar and the rib are substantially non-parallel with one another.

17. A structure according to claim 16, wherein the structure is an aerospace structure.

18. A structure according to claim 17, wherein the first and second parts are of an aircraft wing.

19. A structure according to claim 17, wherein the first and second parts are provided by components of a tail of an aircraft.

20. The structure of claim 16, wherein the rib and spar run perpendicular relative to each other.

21. The structure of claim 16, wherein the hollow triangular cross-section is formed by a first substantially planar portion for abutting a first surface and a second substantially planar portion joined to the first substantially planar portion and for abutting a second surface and a third substantially planar portion which joins together the first and second planar portions and wherein the third substantially planar portion comprises at least one aperture.

22. The structure of claim 21, wherein the first substantially planar portion has a first set of attachment holes formed therein and the second substantially planar portion has a second set of attachment holes formed therein.

23. The structure of claim 22, wherein the at least one aperture in the third substantially planar portion is larger than the first and second sets of attachment holes to provide access to the first and second set of attachment holes.

24. An aircraft wing comprising the structure of claim 16.

25. A tail of an aircraft comprising the structure of claim 19.

26. An aircraft comprising the structure of claim 16.

27. A method of manufacturing a hollow substantially triangular cross-section rib post comprising:
   laying down composite material around a mandrel of substantially triangular cross-section;
   removing the mandrel; and
   forming a first set of attachment holes in a first substantially planar portion of the hollow substantially triangular cross-section rib post, forming a second set of attachment holes in a second substantially planar portion of the hollow substantially triangular cross-section rib post, and forming at least one aperture in a third substantially planar portion of the hollow substantially triangular cross-section rib post that is larger than the first and second sets of attachment holes to provide access to the first and second sets of attachment holes;
   wherein the rib post is configured to attach a rib to a spar in an aircraft.

28. The method of claim 27, wherein laying down the composite material comprises laminating the composite material.

29. The method of claim 28, wherein the composite material is a fiber reinforced material.

\* \* \* \* \*

UNITED STATES PATENT AND TRADEMARK OFFICE
CERTIFICATE OF CORRECTION

PATENT NO. : 8,393,575 B2  Page 1 of 1
APPLICATION NO. : 12/440662
DATED : March 12, 2013
INVENTOR(S) : Perry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 967 days.

Signed and Sealed this
First Day of September, 2015

Michelle K. Lee
*Director of the United States Patent and Trademark Office*